United States Patent
Hsu et al.

(10) Patent No.: US 7,272,667 B2
(45) Date of Patent: Sep. 18, 2007

(54) PORTABLE AND DEDICATED COMPACT DISK READ-WRITE UNIT

(75) Inventors: George Hsu, Santa Rosa, CA (US); Tony Marinus de Rijk, Santa Rosa, CA (US)

(73) Assignee: PNI Corporation, Santa Rosa, CA (US)

( * ) Notice: Subject to any disclaimer, the term of this patent is extended or adjusted under 35 U.S.C. 154(b) by 0 days.

(21) Appl. No.: 10/405,788

(22) Filed: Apr. 1, 2003

(65) Prior Publication Data

US 2004/0199687 A1   Oct. 7, 2004

(51) Int. Cl.
G06F 3/00    (2006.01)
G06F 3/06    (2006.01)

(52) U.S. Cl. .................. 710/14; 710/16; 710/15; 710/8; 710/10; 710/18; 710/19

(58) Field of Classification Search ............ 369/30.33; 361/684; 381/52, 118; 705/57; 710/5, 12, 710/15, 31, 8, 10, 14–16, 18, 19
See application file for complete search history.

(56) References Cited

U.S. PATENT DOCUMENTS

| | | | | |
|---|---|---|---|---|
| 6,141,298 A | * | 10/2000 | Miller | 369/30.33 |
| 6,453,395 B1 | * | 9/2002 | Gehr | 711/162 |
| 6,665,744 B2 | * | 12/2003 | Shimamoto | 710/15 |
| 2002/0161714 A1 | * | 10/2002 | Bell et al. | 705/57 |
| 2002/0186964 A1 | * | 12/2002 | Skarda et al. | 386/118 |
| 2003/0067742 A1 | * | 4/2003 | Su et al. | 361/684 |
| 2004/0054827 A1 | * | 3/2004 | Liu et al. | 710/74 |
| 2004/0081427 A1 | * | 4/2004 | Kwon | 386/52 |

FOREIGN PATENT DOCUMENTS

JP    2002-86841 A   *   3/2002

OTHER PUBLICATIONS

Hugh Bennett, Get the Picture: digital cameras and CD-R need each other, Apr. 2000, Online, Inc., pp. 1-2.*
www.computerhope.com/issues/ch000130.htm, Computer Hope, Enabling / disabling Windows Autoplay, May 11, 2005.*
George Hsu, "Flash Card to CD-ROM Stand-Alone Burner," Disclosure Document #524141, Jan. 6, 2003.

* cited by examiner

Primary Examiner—Kim Huynh
Assistant Examiner—Joshua D. Schneider
(74) Attorney, Agent, or Firm—Fernandez & Associates, LLP

(57) ABSTRACT

A portable CR-RW drive has a CD drive and spindle platform, a chargeable battery power source, at least one docking bay for docking a removable storage medium and a processor supporting firmware for enabling functions of the drive. In a preferred embodiment the drive is, in a portable fashion, used minimally to burn CDs from data stored on the removable storage medium using the battery as a power source and wherein no externally connected device is required to participate in the function of the drive.

2 Claims, 6 Drawing Sheets

PORTABLE AND DEDICATED COMPACT DISK READ-WRITE UNIT

FIELD OF THE INVENTION

The present invention is in the field of hardware for reading and writing compact discs and pertains more particularly to a portable stand-alone and dedicated device for reading and writing to a compact disc from a flash memory.

CROSS-REFERENCE TO RELATED DOCUMENTS

A Disclosure Document related to the present invention, dated Jan. 3, 2003, was filed in the USPTO on Jan. 6, 2003. The Disclosure Document number returned from the USPTO is 524141. The disclosure 524141 is incorporated herein in its entirety by reference.

BACKGROUND OF THE INVENTION

In the area of digital technology one of the most popular mediums for saving and accessing data is the compact disc. The compact disc, hereinafter referred to in this specification as CD, is arguably the most economic storage medium in use today. In a related area, digital cameras have become greatly popular, and are achieving higher and higher image resolution. However users of digital cameras must typically transfer images to a PC-based system in order to arrange, edit, and store them. It becomes logical then to store photos and video data on CDs in order to free up precious storage facilities like a computer hard drive.

Recent technological advances have enabled the general public to record or "burn" their own CDs using PC-based CD burners. In many new computers, CD read-write (RW) drives are provided in addition to the traditional CD read-only-memory (ROM). More recently, a host of manufacturers have developed and provided external CD RW drives that connect to a PC through USB or other appropriate communication ports.

CD-RW drives are typically used for creating music, picture, or data CDs from data that resides on a semi-permanent or permanent storage medium such as a computer hard-drive or on another CD. Data that is captured using a digital capture medium like a digital camera or cam-recorder can be transferred to a storage facility that is accessible to a CD-RW unit through a process of uploading the data to a temporary storage area on the computer hard-drive and then accessing the data from the temporary storage area by running the CD-RW drive and user-operated software that is installed on a computer hosting the CD-RW drive.

Hard-wired and USB-peripheral CD-RW drives depend on the computer operating system, and software installed on the system, in order to function properly. There are several problems with this approach that lend to certain inconveniences and ultimate frustration for many users. One drawback with USB-connected peripheral CD-RW drives is that it is not convenient to upload data into a software "burn CD" window on the computer when the data must be accessed from a separate storage medium over a separate USB cable. For USB-connected drives it is recommended that the data for burn be uploaded from the capture device to the computer before accessing the data for a burn operation.

Another problem with computer-dependant units is that often during a burn operation, the operation is aborted due to typical computer hardware interruptions. A common interruption is associated with the input/output I/O support hardware. The port experiences a kind of "server timeout". Such software or hardware interruptions cause an "abort" forcing the user to re-start the operation. If the user was burning a CD-R (read only) disc when an abort operation occurs then the disc is rendered useless.

Still another issue is the complexity of a typical burn process in terms of required user steps that must be performed before a CD can be burned, including those for opening the application, browsing for the data, uploading the data to temporary storage, and so on.

One manufacturer has provided a computerized video-editing station that has a CD-RW drive included therein. An article about the system entitled, GET the PICTURE: digital cameras and CD-R need each other, was authored by Hugh Bennett, and is published in an issue of E-MEDIA PROFESSIONAL: April, 2000 and is referenced herein as prior art.

The device introduced in the paragraph above was advertised as a portable set-top unit that is designed to provide image editing and archiving capability without the use of a desktop PC. The unit is self-contained, but requires a TV coupling for operation. The system depends on a complex operating system (Java-based) that supports an IDE/ATAPI 4×20 speed CD recorder. The CD recorder can be used to burn images and video directly from Flash or portable micro-hard-drives that can be inserted into the unit through available docking bays.

Images or digital video taken with a camera that uses the supported flash cards or micro drives can be accessed once the card or drive carrying the data is inserted into an appropriate bay and the image data can be burned directly onto a CD input into the CD-drive bay of the unit. While this system enables data on a flash card to be burned onto a CD, the system is commercially expensive and the CD RW drive is dependant on the computer operating system. Additionally, the device is not portable because it depends on a video graphic display (television monitor) to enable a user to interact with the system. Moreover, a user cannot copy a CD with the system.

What is clearly needed is a portable and dedicated CD-RW drive that can be operated without a video monitor or a computer, to create CDs from a compact flash or other portable memory card directly, and preferably using a one-touch technology. Such a dedicated unit would not depend on a complicated operating system and could be provided in a more economical package.

SUMMARY OF THE INVENTION

In a preferred embodiment of the present invention a portable write-capable disk drive is provided, comprising an optical disk drive and spindle platform, at least one docking bay for docking a removable storage medium, and a processor supporting firmware for enabling functions of the drive. The drive is characterized in that the drive is, in a portable fashion, used minimally to burn optical disks from data stored on the removable storage medium wherein no externally connected device is required to participate in the function of the drive.

In some preferred embodiments the processor is stored in non-volatile on-board system memory and includes CD reader and writer code. Also in some preferred embodiments the transfer of data between docked storage mediums is possible in a portable manner using battery power without requiring connection to an external device. In still other preferred embodiments burning of a CD from a source CD having data thereon is possible in a portable manner using battery power without requiring connection to an external device. In still others a display for displaying states of operation and operation results.

In still other embodiments of the invention the firmware includes code for identification and confirmation of inserted storage devices including CDs and code for detecting which of those inserted devices has data stored thereon. Still further, the power source may be a battery chargeable through a standard cigarette lighter socket of an automobile using an accessory adapter. Further yet the drive may include a USB port and a video/audio output port.

In yet further embodiments of the drive of the invention there may be code for enabling playback of music CDs having playback of audio audible through an audio jack supporting an ear bud or headset. There may also be code for indexing and sorting files loaded on one or more of the storage mediums for the purpose of selecting certain files to burn onto a CD.

In another aspect of the invention a method for writing to a CD data stored on an insertable storage medium inserted into a portable CD-RW drive, the drive including, at least one docking bay for docking the removable storage medium, and a processor supporting firmware for enabling functions of the drive is provided, comprising steps of (a) opening a CD compartment of the portable drive; (b) placing a blank CD on the drive platform; (c) closing the CD compartment; (d) identifying the data states of the CD and of the inserted medium; (e) setting up a data write operation according to the recognized data states; and (f) writing the data stored on the inserted storage medium onto the CD.

In preferred embodiments of the method, in step (a), the CD compartment is accessible by opening a cover portion of the portable drive. Also in preferred embodiments, in step (a), the CD compartment is a motorized drawer. In still other embodiments, in step (b), the blank CD is one of a CD-R or CD-RW. In yet other embodiments of the method, in step (c), closing of the CD compartment activates firmware to initiate the remaining steps (d), (e), and (f) in stated order. In still other embodiments, step (c), the compartment is a motorized drawer. And in still others, step (d), the possible data states are has data and has no data.

In still other embodiments of the met5hod, in step (d), identifying the data states is performed automatically by firmware loaded on the processor, and in others, in step (d), the inserted medium is an electrically-rewritable flash memory medium. Further, in step (d), the inserted medium may be a Memory Stick™.

In still other embodiments, in step (d), the inserted medium is one of a secure smart card, Compact Flash™, Smart Media™, Secure Digital™, MMC™, or XD™ device. The data may be written using red laser technology, or in other cases blue laser technology.

In yet another aspect of the present invention a method for writing to a CD data sourced from another CD using a portable CD-RW drive having a removable storage medium inserted therein, the drive including at least one docking bay for docking the removable storage medium, and a processor supporting firmware for enabling functions of the drive is provided, comprising steps of (a) opening a CD compartment of the portable drive; (b) placing a source CD on the drive platform; (c) closing the CD compartment; (d) identifying the data states of the CD and of the inserted medium; (e) setting up a data write operation according to the recognized data states; (f) writing the data stored on the CD onto the inserted storage medium; (g) opening the CD compartment of the portable drive; (h) removing the source CD and inserting a Blank CD; (i) closing the CD compartment; (j) identifying the data states of the CD and of the inserted medium; (k) setting up a data write operation according to the recognized data states; and (l) writing the data stored on the storage medium to the blank CD.

In some preferred embodiments of this method, in steps (a) and (g) the CD compartment is accessible by opening a cover portion of the portable drive. Also in some preferred embodiments, in step (a) and (g) the CD compartment is a motorized drawer. In yet other embodiments, in step (b) the source CD is one of a CD-R or CD-RW or a music CD.

Still further, in some embodiments, in steps (c) and (i) closing of the CD compartment activates firmware to initiate the subsequent steps (d), (e), and (f) for (c) and (j), (k), and (l) for (i) in stated order. Also, in steps (d) and (j) the possible data states may be has data and has no data. In other cases, in steps (d) and (j), identifying the data states is performed automatically by firmware loaded on the processor. In still others, in steps (d) and (j), the inserted medium is an electrically-rewritable flash memory medium. In yet others, in steps (d) and (j), the inserted medium is a Memory Stick™, and in still others, in steps (d) and (j), the inserted medium is one of a secure smart card, Compact Flash™, Smart Media™, Secure Digital™, MMC™, or XD™ device.

In some cases, in step (l), the data is written using red laser technology. In other cases, in step (l), the data is written using blue laser technology.

In still another aspect of the present invention a method for upgrading firmware embedded on a processor of a portable CD-RW drive, the drive including at least one docking bay for docking a removable storage medium containing the upgrade is provided, comprising steps of powering on the portable CD-RW drive; inserting the removable storage medium containing the upgrade into an available docking bay; (c) identifying the data state of the inserted storage medium including recognition of the upgrade; (d) setting up an upgrade operation; (e) installing the upgrade from the inserted storage medium to the processor; and (f) reformatting the removable storage medium for normal use.

In some preferred embodiments, in step (a), the power source is a battery. In other preferred embodiments, in step (b), the removable storage device is an electrically-rewritable flash memory card. In still others, in step (c) the upgrade is recognized by existing firmware on the processor. In still other embodiments, steps (c), (d), (e), and (f) may be automated steps triggered by performing step (b).

In still other embodiments of this method, the optical disk is one of a CD-R disk, a CD-RW disk, a DVD disk, or a VCD disk. In others the removable storage medium is one of a flash memory device, a static RAM device, a floppy disk, a CD-R disk, a CD-RW disk, a DVD disk, or a VCD disk. In many cases the drive uses an ATA/ATAPI interface.

In yet other cases the data transfer sequence is initiated and completed by using a single button operation user interface, and in others the optical disk is a music CD, the removable storage medium is flash memory and the firmware controls conversion of the content on the music CD into a compressed data format for storage onto the flash memory, the flash memory compatible with an MP3 or similar audio playback device for playback of the compressed music files. The removable data storage medium is non-volatile and is programmed from data contained on the optical disk storage medium.

BRIEF DESCRIPTION OF THE DRAWING FIGURES

DESCRIPTION OF THE PREFERRED EMBODIMENTS

The inventor provides a compact, portable and dedicated CD burner capable of burning a CD-R or CD-RW with image or other data from an insertable data storage medium without depending on a host device or an operating system. The methods and apparatus of the present invention are described below.

Figure 1:
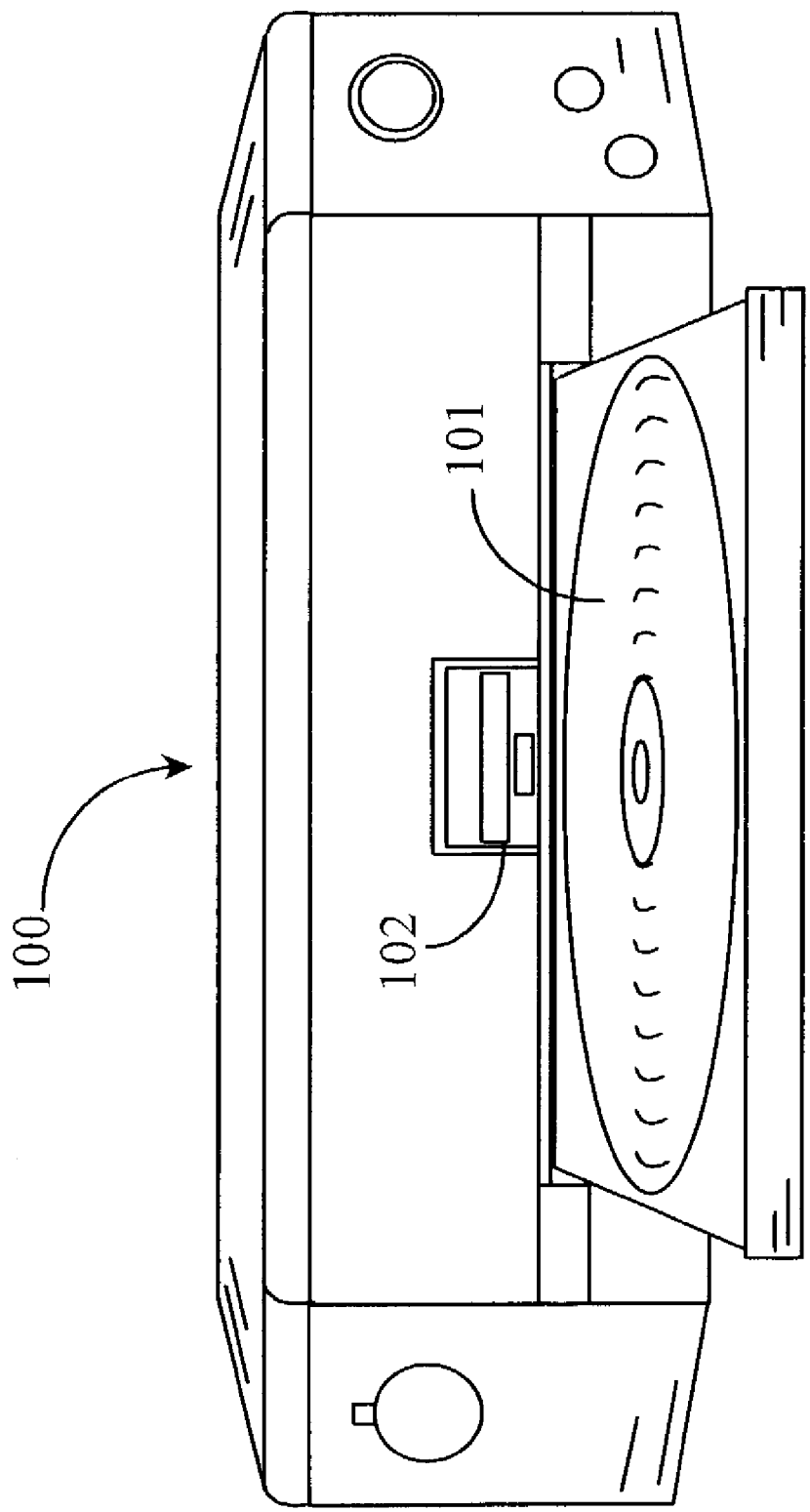
FIG. 1 is a perspective view of a combination video-picture editing and CD-RW drive according to prior art.

FIG. 1 is a perspective view of a combination video-picture editing and CD-RW drive 100 according to prior art. Device 100 is portable and can be operated without the aid of a PC. However, device 100 is a multitask computerized device that is dependant on an operating system and a graphical user interface (GUI) for providing functions. Device 100 weighs approximately 3.1 Lbs and also requires a separate television monitor as a display, rendering it relatively unsuitable for portable field use. The power requirement for device 100 is AC 100-240 Volts from a standard power outlet. While device 100 is described as being portable, it is not truly portable in the sense of use of the device in the field. For example, one cannot take device 100 on a field trip and use it to create a picture CD from a flash card that was just populated with digital photos from a digital photographing device.

Device 100 is a multitasking device as described above that is operated with the aid of a remote control unit (not illustrated). Device 100 has video and image editing features, the use of which depends on the device being coupled with a video monitor operating a GUI. The editing capabilities include Image delete, Image rotate, Zoom, and Picture quality adjust. A CD-R recordable disc 101 fits into the CD-drive portion of device 101. A bay for accepting a Compact Flash™ or Smart media™ card 102 is provided and adapted to accept the cards in order to transfer picture and/or video files from the card to CD.

While coupled to a VCR for TV output, pictures and video can be played back, edited, and then the device can be used to burn the media onto CD 101. Device 100 also has a parallel printer port for coupling the device to a portable printer for the purpose of printing without the aid of a PC. Standard recording speed 4× and playback speed 20× is supported. In playback mode, device 100 supports JPEG, Wav, QuickTime, OpenDML and JPEG AVI. Dimensionally speaking, the device is larger than current PC-dependant external CD-RW drives offered in the market.

While device 100 is not dependant upon a PC to provide function, it is not truly portable or dedicated for use in the field. Device 100 uses a mini-computer operating system (Java-based) to enable all of the supported tasks, and it cannot be economically provided at prices lower than standard PC CPU prices of approximately $800.00 because it is, in effect, a CPU with a multitasking operating system installed. While device 100 can be utilized in the home while coupled to a video unit or a portable printer, it cannot be taken out into the field, as a stand-alone consumer electronics appliance, where consumers operate their digital photographic devices, for example.

It is an object of the present invention to provide a dedicated CD-RW device that can be used out in the field to burn the contents of an insertable storage device to a recordable CD without requiring a hard-wired power source, video monitor, GUI, or remote control operation.

Figure 2:
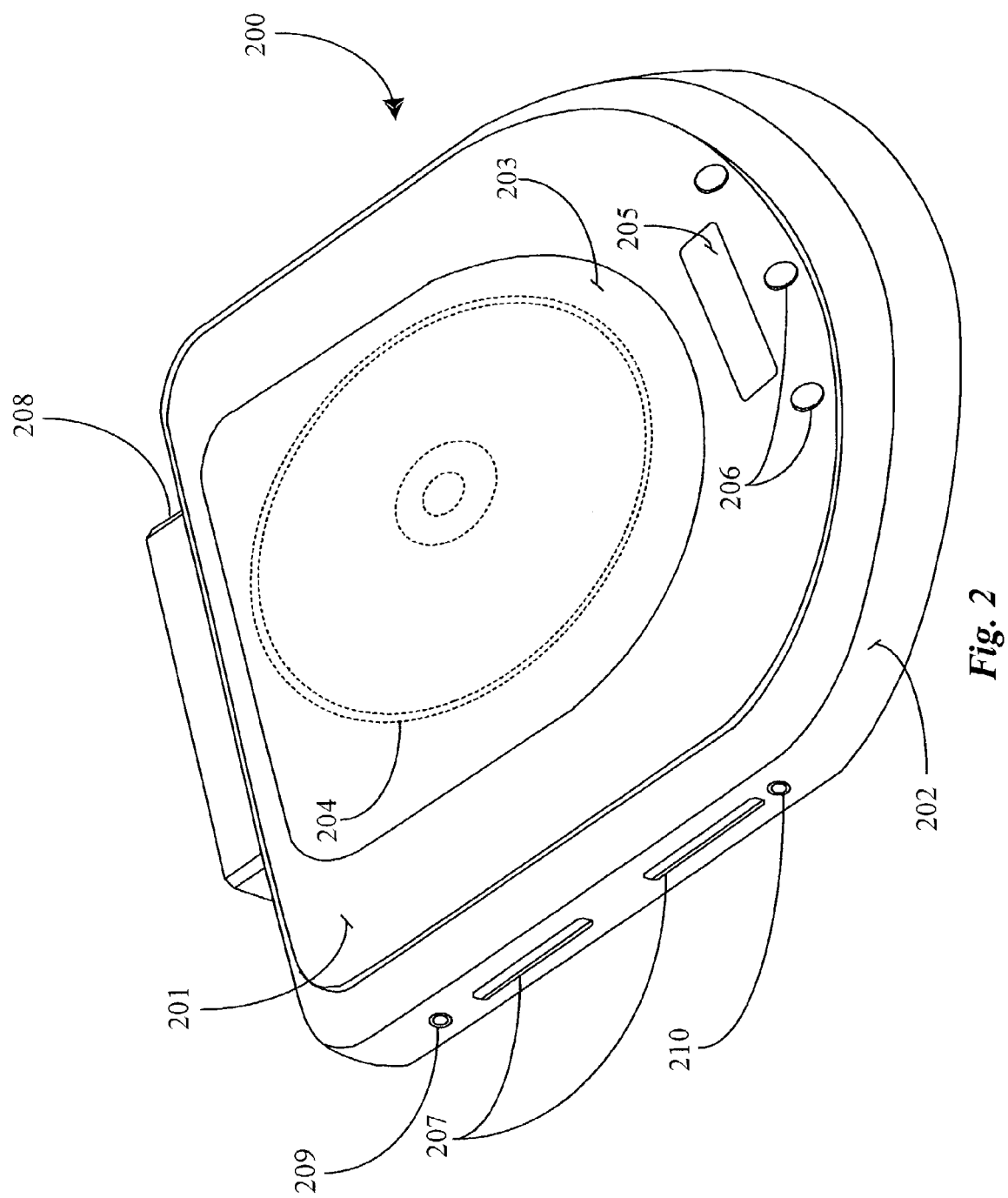
FIG. 2 is a perspective view of a dedicated, portable CD-RW drive according to a preferred embodiment of the present invention.

FIG. 2 is a perspective view of a dedicated, portable CD-RW drive 200 according to a preferred embodiment of the present invention. Device 200 is provided in the form of a lightweight and compact unit similar in weight and profile to a common portable CD-playback device. The internal components of device 200 are, in a preferred embodiment, housed in a durable lightweight polymer material that is shock resistant. Device 200 has a base portion 202 and a cover portion 201. Cover portion 201 is hinged to base portion 202 (hinges not shown) at the rear portion of cover 201 to enable opening and closing. Opening of cover portion 201 in this example enables mounting and dismounting a CD-R or CD-RW illustrated herein as CD 204, from a motorized drive-spindle platform (not shown) of device 200. CD 204 is visible in this example through a transparent window 203 mounted on or formed as part of cover portion 201 of device 200. In an alternative embodiment of the present invention cover portion 201 is not required. In such case a motorized CD drawer can be provided for loading and unloading CDs into device 200. The inventor provides cover portion 201 for the purpose of convenience and to eliminate unnecessary motorized components associated with a motorized drawer.

Base portion 202 presents a low profile. However, the height dimension of device 200 is sufficient in this example for a single CD drive platform and the motor components that are used for mounting and spinning CD 204 during operation. Laser components used to write data to a blank CD can be of the form of standard red laser components used in most CD-RW drives, or of the form of newer blue laser components being developed for optimum data writing, that allow more data to be written to a smaller space. An overall height of approximately 25 mm is sufficient for the purpose. In other embodiments of the invention, the height profile of device 200 can be more than 25 mm without departing from the object of the present invention. In one embodiment device 200 is capable of also burning DVDs and VCDs instead of or in addition to CDs. In this more advanced embodiment, the firmware is enhanced to support the additional functions and blue laser technology is used to more compactly write the data.

Device 200 supports at least one docking bay 207 for accepting an insertable storage device such as a Compact Flash™ card or other known brands of media cards. In this particular example, there are two bays 207 each supporting a different type of media card. The exact types of media cards supported including the number of bays used to dock those cards will depend on manufacturing considerations. In a simplest embodiment only one bay 207 is provided that is compatible with one or more types of media cards.

Device 200 has a display 205 on cover portion 201. Display 205 can be an LED-type or LCD-type display that is large enough to provide indication of device mode and status. In one embodiment, display 205 is interactive end can be used to highlight and tag data files for playback order and/or for creating order of and inclusion of in a burn operation. In this embodiment, the intelligent firmware includes code for indexing and sorting files loaded on one or more of the storage mediums, for the purpose of selecting certain ones of the storage medium files to burn onto a CD. Device 200 has, in this example, three input buttons 206 for providing input. These simple one-touch buttons provide all of the input required for device 200 for enabling dedicated functions. In the above-described embodiment, the buttons may also provide means enabling the user, via the interactive display, to highlight and select certain ones of the storage medium files indexed and sorted by the intelligent firmware, for defining the order of inclusion into the CD burn operation, or for selecting certain ones of the files to burn onto the CD. One of buttons 206 is an input button for opening cover portion 201, overriding other functions that may be in process. Another of buttons 206 provides power on and power off to device 200.

The remaining button (206) provides a multifunction input that depends on preferred configuration of on-board "intelligence" (enabled by firmware) of device 200. The functions of this button include "burn CD from storage device", "Playback CD", and "Load storage device from CD" depending on the use-case scenario. For example, if a storage device with digital data is inserted into one of bays 207 and a blank CD-R is inserted into position then device 200 automatically sets up a burn of media stored on the inserted card to the inserted CD with one touch of the single input button 206. In this case all of the media on the card will be burned onto the disc. If a music CD is inserted and no storage devices are inserted in any of bays 207, then device 200 automatically plays the CD. If a CD with image data is inserted into device 200 and a blank storage device is inserted then device 200 automatically loads the storage device with the image data on the CD.

The functions described in the paragraph immediately above represent only the minimum functions that device 200 is capable of in a preferred, dedicated and portable environment such as when using device 200 in the field. In another embodiment, more functions can be added to device 200 without departing from the spirit and scope of the invention. For example, if device 200 is coupled with a video display unit (VDU) then playback capability is extended to playback of music, and picture CDs as well as playback of image data stored on cards inserted into one or more of bays 207. In still another embodiment playback of video is supported. The inventor illustrates a minimum functional embodiment for the purpose of demonstrating a dedicated and portable version of device 200 adapted for field use wherein there is no PC, GUI or VDU coupled to the device.

Device 200 in this example has an audio port 209 adapted to enable connection to an ear bud or headset for listening to music CDs without a VDU connection. An audio/video output port (not visible in this view) is also provided for enabling connection of device 200 to a suitable VDU for playback of video, images, and music from either CD or from an inserted storage device. While device 200 is connected to a VDU, one touch method is used for play back. The device will attempt to play any media that it finds either on a CD or on a card, or both. In one embodiment, a default option can be set either to CD playback or playback from storage device so as to enable prioritization of order of playback of media. For example, if the option is set to CD, then device 200 does not play back from storage unless there is no CD inserted or if there is a CD inserted but that CD is void of data. If a data bearing CD and a data bearing storage device are present and the priority is set to CD, then playback mode while connected to a VDU will first playback data on the CD and then any stored media until all the media has been played or until interrupted by a second touch of the playback button is performed during play back.

In one embodiment of the invention, CD burn, playback, and storage load from CD are automatic operations, which are triggered by closing cover portion 201 after a CD has been inserted. Intelligent firmware selects what function will be performed based on system checking of the states of inserted mediums. More particularly, device 200 can detect whether there is valid data or no data on a CD or storage card.

Device 200 has a power supply 208 provided, in this case, as a rechargeable battery similar to batteries used for cellular telephones or digital handheld cameras. Battery 208 is designed to dock to device 200 using any of the standard methods known in the art for battery powered digital devices. Battery 208 is of sufficient power to produce 600 to 900 mA at 5 Volts in continuous write mode. Using device 200 in the field, a 128 MB flash card full of image data can be burned onto a CD in approximately 2 minutes at a 20 to 24× drive speed. The burn operation uses about 3 to 4.5 Watts. A standard NiMH or Lithium battery is sufficient for the purpose.

An object of the present invention is to provide adequate CD-write function without depending on an operating system. No separate or remote operating system is required on device 200 in order to practice the present invention. The dedicated functions of device 200 are accomplished using an embedded and upgradeable firmware loaded on the processor of device. In this way, device 200 can be provided in an economical way for a new market of consumers that will utilize it in the field to offload data stored on image-full cards from photographic devices onto CDs so that cards can be erased and re-used while still in the field (instant film). In a simple embodiment device 200 will require perhaps 4 megabytes of RAM and 512 KB of Flash ROM.

In one embodiment of the present invention a version of device 200 is provided that does not require a battery, but instead draws power from a transformer plugged into a standard home electrical power outlet, or into a 12 volt paower outlet in an automobile. In still another embodiment both standard AC/DC and battery power sources are provided as power sources for device 200.

Figure 3:
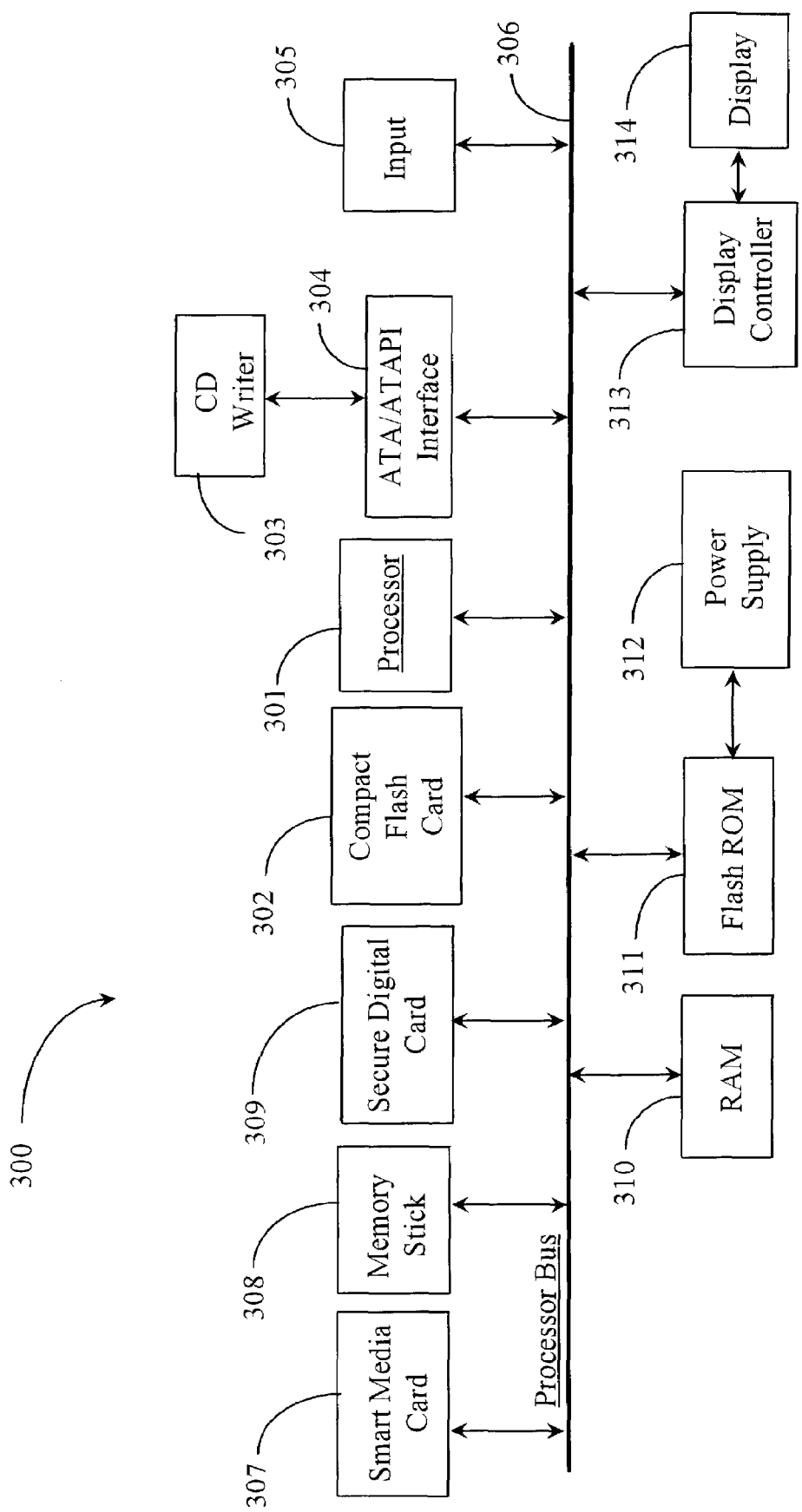
FIG. 3 is a block diagram illustrating a minimally required component package of the device of FIG. 2.

FIG. 3 is a block diagram illustrating a component package 300 of device 200 of FIG. 2. Component package 300 uses a processor bus structure 306. Bus 306 provides all of the communication between included components. A random access memory (RAM) 310 is provided within circuitry 300 and is adapted to store permanent and semi-permanent data used in the operation of device 200. A Flash ROM 311 is provided within circuitry 300 and adapted to store boot code and upgrade firmware. A power supply 312 is provided as a power source of power to device 200. As described further above, a standard rechargeable NiMH or rechargeable lithium battery is adequate for the purpose.

A display controller 313 is provided within component package 300 and is adapted minimally to provide control functions for an LED or LCD display illustrated herein as display 314. In another embodiment, controller 313 may also control playback display of media on a connected VDU. An input module 305 is provided within package 300 and is adapted to enable functions associated with input indicia on the face of device 200.

In this example, there are bay-circuitry components illustrated for temporary storage devices. These are for Smart Media Card 307, Memory Stick 308, and Secure Digital Card 309, and Smart Media card 302. These components are optionally provided depending on the media card types supported. In a simple embodiment only one or two brands of media cards are supported.

Device 200 has an on-board processor 301 that is adapted to contain all of the firmware for device operation. Processor 301 supports circuitry and firmware for enabling a Compact Flash card to be utilized as a default media card used as a source device for burning CDs in the field. In a preferred embodiment of the invention device 200 is upgradeable in automated fashion through inserting a Compact Flash card containing a firmware upgrade. A CD burn or write application and driver 303 are provided as part of the firmware package.

An Advanced-Technology-Attachment-Packet-Interface (ATA/ATAPI) 304 is provided and resides on processor 301. ATA/ATAPI Interface 304, a variation of Integrated Device Electronics (IDE) interface, is provided for the purpose of standard data interface for controlling CD-ROM function. Dedicated executable code embedded onto processor 301 provides all of the required application components for the use of device 200 including the intelligence for checking for existing data on inserted CDs and media cards and making decisions related to instant mode of operation.

Package 300 does not include an operating system or other multitask dedicated software. Processor 301 is upgradeable and supports all of the firmware required to enable operation. In another embodiment of the invention buffers are provided between each of the media card components 307, 308, and 309, and between inputs module 305. However in this embodiment data buffers are not required because data buffering can be performed on processor 301 using firmware data buffers. The preferred configuration of package 300 supports the basic functions of device 200 as might be used in the field chiefly for burning media from Compact Flash and other supported storage cards onto a CD-R or CD-RW.

In more complex functional embodiments, the following additional capabilities are possible with respect to the use of device 200 while retaining portable characteristics of the device:

Transferring or copying files from an inserted storage device to another.
Copying content from a CD to Flash and then burning a blank CD with the content.
Burning or copying a DVD or VCD from a connected storage device (USB or suitable port and cable required).
Indexing images on CD-RW for playback in slide-show format onto DVD/CD playback devices (requires additional firmware).
Copying a CD to CD (requires sufficient D-RAM and additional CD source drive).
Printing media using smart printer (requires USB or other port and cable).
Converting audio CD content to any of several known compression formats such as MP3 for play back on an MP3 player and similar devices using other compression formats, by reading an audio CD in the drive, compressing it, and then burning the compressed file to flash memory, so that the flash memory can be used for playback on a standard MP3 player.

In one embodiment, device 200 has a USB port for coupling with a dedicated photo printer that can take direct USB input from cameras. In this embodiment the printer can print files directly from a CD-RW. The same USB port can accept input from a connected camera for burning files stored on the camera directly to a CD-R. In this embodiment Flash can be bypassed altogether. In yet another embodiment, the USB port enables device 200 to perform as an external CD drive for a computer or laptop. The additional intelligence required for the above-stated functions can be added to firmware on processor 301. Moreover, USB capability can be used on device 200 for example to transfer music files compressed into MP3 format or similar types to a connected MP3 player or similar device. In this case, device 200 is capable of copying contents of an audio CD inserted into the CD compartment and compressing the files for storage on the removable storage medium wherein the removable storage medium can be removed and inserted into a compatible bay on a playback device such as an MP3 player.

In yet another embodiment, device 200 has more than one disk drive wherein the disks themselves are the removable storage mediums which can include CDs, DVDs, VCDs, floppy disks, micro disks, and others. There are many possible architectures that can be supported while still maintaining a stand-alone device that is truly portable in use. However, it is reminded herein that in a preferred embodiment, emphasis on portability is meant to include that ability to take the device out in the field for the primary purpose of being able to burn one or more CDs from data stored on a removable storage medium from a photographic device. In this most compact and simple form, the device can be manufactured most economically and is most practical in a portable and stand alone environment.

In a preferred embodiment however, device 200 retains minimum and dedicated function for portable use in the field using battery power. Burn capability on one charged battery enables approximately 20 CD-R burn operations from an inserted 250-megabyte card. A user operating device 200 in the field can, after taking pictures with a digital camera or similar device insert an image-loaded card from the device to burn a CD-R in a one touch operation. The user can then erase the card and take more pictures to be burned on a next CD-R and so on with up to 20 operations supported on a single battery charge. In one embodiment the burn operation does not require activation of a button. In this case it is triggered by closing cover 201 after inserting a blank CD. Likewise the device can automatically erase inserted storage cards after burn has completed successfully and the data is no longer required. It is noted herein that the fact that a battery source can be used to power device 200 does not construe a limitation to the invention as device 200 can also be powered from a semi-portable power source such as a power outlet in an automobile or one provided on a portable electricity generator. A battery source simply provides the most flexible of portable scenarios.

Figure 4:
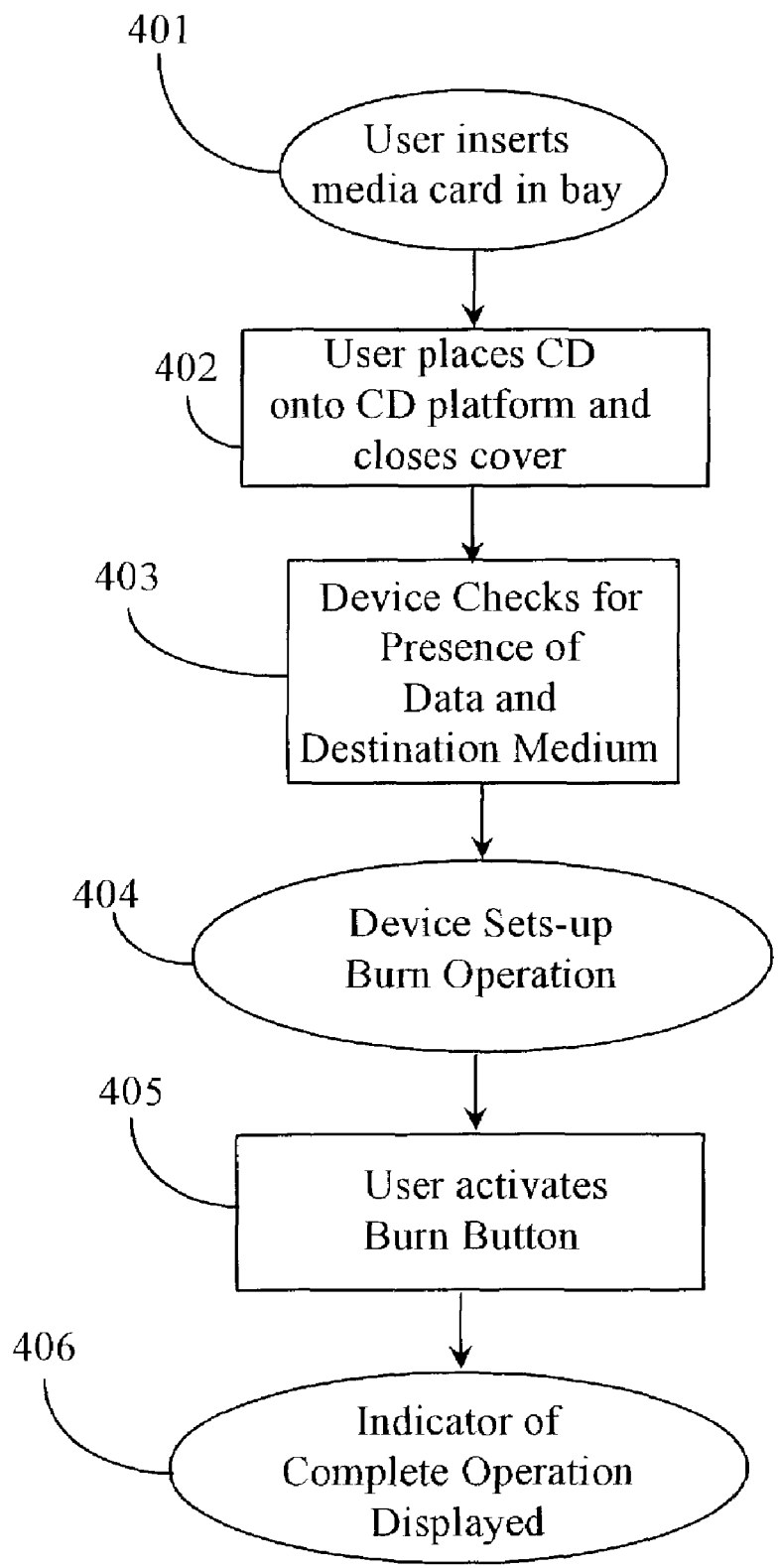
FIG. 4 is a process flow diagram illustrating user steps for burning a CD-R or CD-RW from a media card, using the device of FIG. 2 according to an embodiment of the present invention.

FIG. 4 is a process flow diagram illustrating user steps for burning a CD-R or CD-RW from a media card, using device 200 according to a preferred embodiment of the present invention. At step 401 a user inserts a media card with image data loaded thereon from a digital photographic device into a compatible bay analogous to one of bays 207 described with reference to FIG. 2 above. The media card may be one of a number of known types including Smart Media™, IBM Micro-drive™, Sony Memory Stick™, Compact Flash™, or other known and supported card types.

At step 402 the user of step 401 opens cover (201 FIG. 2) and places a blank CD-R or CD-RW onto the CD-burn platform and closes cover 201. Completion of step 402, in one embodiment orders a pending burn operation to be configured according to detection of data stored and any blank storage.

At step 403, the device performs a check for presence of data on each of the storage devices present (card and CD) to determine smart mode for burn. For example, if the CD is blank but the card has data then the logic will caused the device to set-up for a burn from the card to the CD as is shown in this example. At step 404, the device sets up to burn the CD from the inserted media card. In one embodiment a mode priority is set either to the inserted medium or to the CD for determining the destination for the data. In this example the CD is the destination for the data.

Optionally, at step 405, an input button analogous to one of buttons 206 described with reference to FIG. 2 is activated to confirm and give the go ahead for the pending operation. In one embodiment step 405 is not required because the device immediately begins writing to the CD when cover 201 is closed. In this case, opening the cover aborts the operation in progress.

At step 406, an indication of a completed burn operation is displayed on a LCD or LED analogous to display 205 described with reference to FIG. 2 above. In addition to display involvement at step 406, the mentioned display can be active from the point of step 402 for the purpose of reporting current status results of each step.

It will be apparent to one with skill in the art that there may be fewer or more steps for burning a CD than are illustrated in this example without departing from the spirit and scope of the present invention. For example, step 405 is an optional step assuming that closing of the device cover initiates the burn operation. Alternatively, the process of this example may involve transfer of CD data to a blank media card depending on the outcome of step 403. Firmware, in a preferred embodiment, enables intelligent mode selection based on the inserted storage medium and their data states. The selected mode by default sets up a burn to CD in the case of a blank CD inserted or a load card in case of a blank card inserted. In one embodiment data from one inserted card is transferred to a blank inserted card based on the same logic. There are many possibilities.

Figure 5:
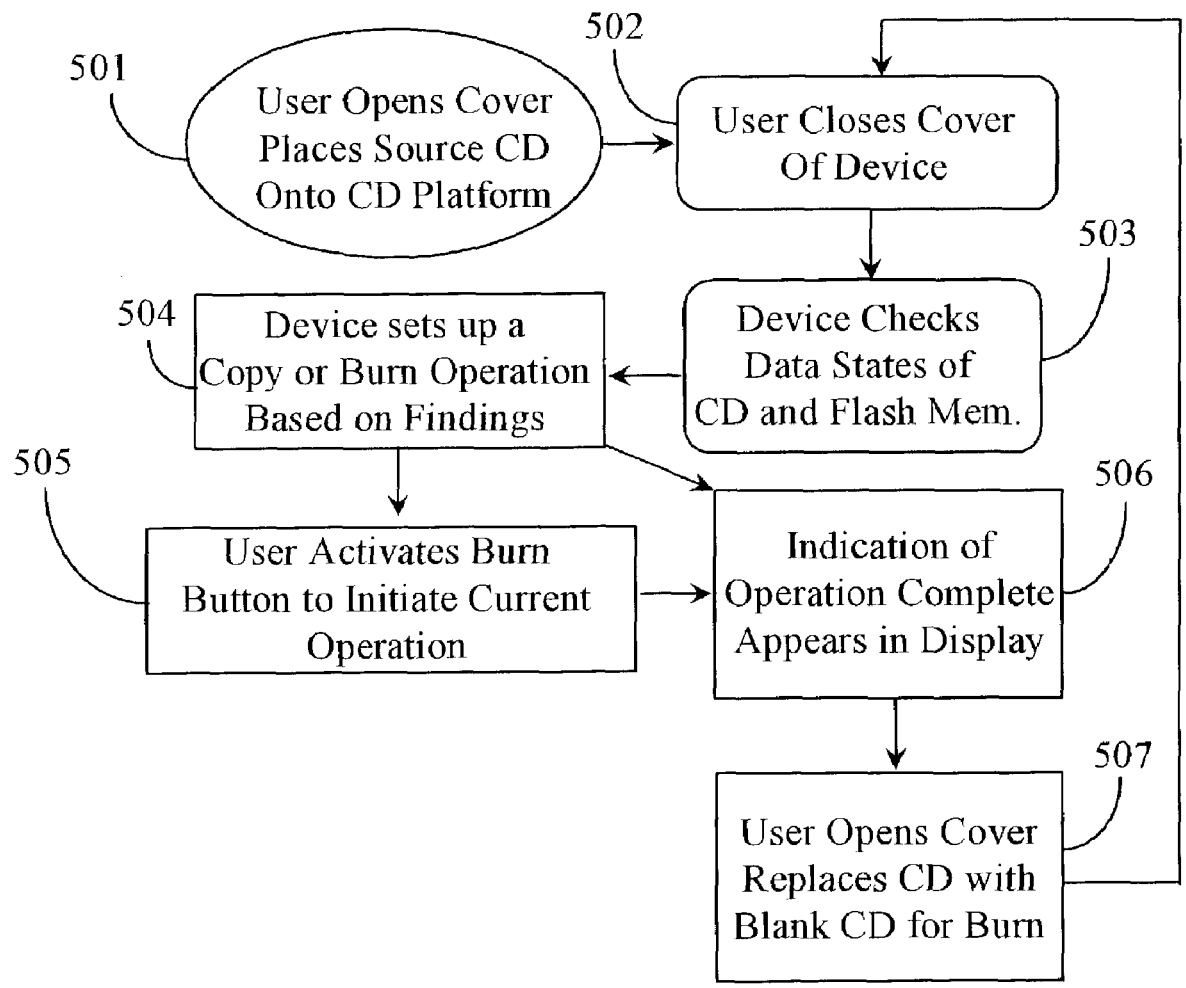
FIG. 5 is a process flow diagram illustrating user steps for copying a CD from another CD using the device of FIG. 2 according to an embodiment of the invention.

FIG. 5 is a process flow diagram illustrating user steps for copying a CD from another CD using device 200 of FIG. 2 according to an embodiment of the invention. In a simple embodiment of the invention, device 200 as described with reference to FIG. 2 above has only one platform for CD loading. Therefore, burning a CD from another CD requires temporary storage of data from the source before the blank CD can be burned. At step 501 a user opens the device cover and loads a source CD to be copied onto the CD platform. At step 502 the user closes the cover of device 200.

At step 503 the device checks the status of the loaded CD for data and in this point of the process finding data, checks compact flash for absence of data. Finding an absence of data on the flash card, at step 504 the device sets a current operation, at this point in the process, a copy operation of data from the CD to Flash. It is noted herein that steps 502-504 are revisited in this process scenario of copying a CD from a source CD. In one embodiment of the invention, steps 503, 504 and initiation of the copy operation (505) are automated after the user closes the cover at step 502. In this case step 504 is immediately followed by step 506 bypassing user-step 505. At step 506 an indication of operation complete appears in the display. At this point of the process the data on the source CD is successfully copied to Flash.

In another embodiment, immediately after step 504, the user activates the burn button to initiate the copy operation of data from the CD to flash memory at step 505. At step 506 then indication of operation complete appears in display. At step 507 the user opens the cover and removes the source CD and inserts a blank CD for burn. The process resolves back to step 502 (close cover). Revisiting step 503, the device now finds data loaded in flash and a blank CD inserted for burn. Revisiting step 504, the device sets up the next operation, burn CD from data in Flash. Alternatively as previously described, step 505 (user initiated action) is bypassed and the process resolves to step 506 display of completed operation. The copy operation is complete at this point and the user may remove the burned CD from the platform. The copy process may be repeated for any number of CDs provided battery power is sufficient. According to estimated battery power of a standard charged NiMH or Lithium battery, up to 20 picture CDs can be burned.

In still another, more advanced embodiment of the invention, there are two CD platforms in device 200. In this case the height profile of device 200 as described with respect to FIG. 2 would have to be increased to provide enough room for an additional CD compartment under the existing CD platform. However in a preferred embodiment, only one CD drive platform exists in order to provide an optimum portable user experience.

Figure 6:
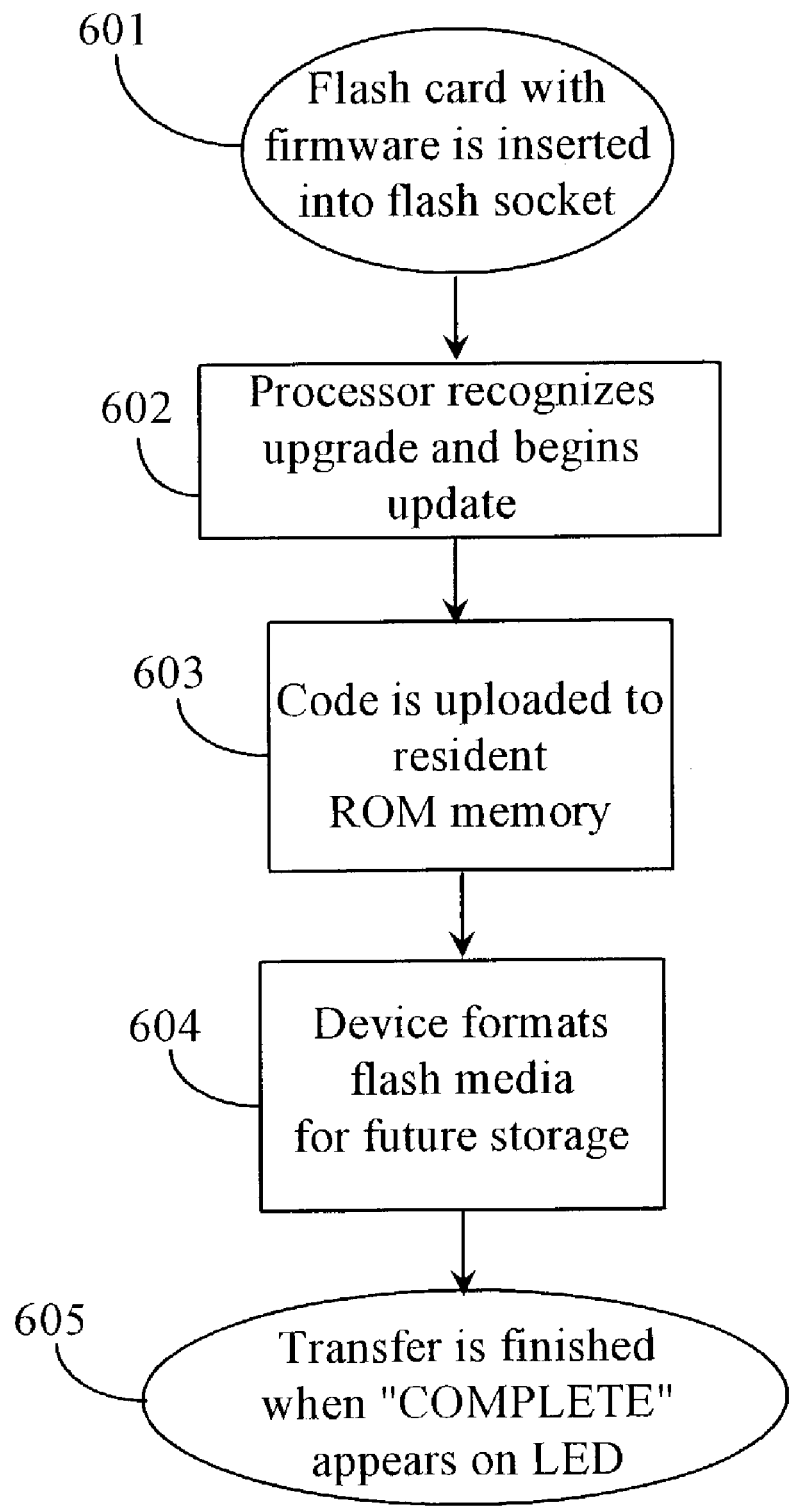
FIG. 6 is a process flow diagram illustrating steps for upgrading the firmware of the device of FIG. 2 using a flash card carrying an upgrade according to an embodiment of the invention.

FIG. 6 is a process flow diagram illustrating steps for upgrading the firmware of device 200 of FIG. 2 using a flash card carrying an upgrade. At step 601 a flash card with a firmware upgrade executable is inserted into a docking bay adapted to accept Compact Flash. At step 602 the on-board processor recognizes an upgrade and automatically executes the update.

At step 603 the upgrade code is uploaded from flash into resident memory (ROM). At step 604 after the upgrade is completed, the device re-formats the flash card so that it may be used as a normal flash card for storing data erasing the upgrade. At step 605 an indication of operation complete appears in display.

In a preferred embodiment of the present invention device 200 can be used in the field and away from power outlets and VDU systems for the purpose of burning data from storage cards onto blank CD-Rs or CD-RWs. In other embodiments, various versions of device 200 can be provided with additional capabilities while retaining a portable embodiment. The compact nature, affordability, and ease of use of device 200 in the field targets a new market of consumers who whish to permanently save image data captured in the field to economical CD storage so that they may continue to operate in the field capturing more data for storage. For example, CDs loaded with image data can be safely and economically stowed away and the storage cards generic to the image capture devices can be erased and re-inserted to capture more image data for burning more CDs all without the user having to connect to a master device or resident power supply. Likewise, music, image, and data CDs can be copied to recordable CDs using device 200 with sufficient memory card capacity without connection to a master system or other host device or resident power supply.

In one embodiment of the present invention there are several docking bays for docking storage cards that can be utilized in series for copy operations from a CD full of data (650 MB). In this embodiment, the device recognizes all of the storage cards inserted and copies data to a first storage card until it is full and then to a second card and so on until all of the data has been copied to temporary storage. When a new blank CD is inserted then the device burns the data from each of the cards in order to the CD.

The method and apparatus of the invention can be used anywhere that a user travels and does not depend on any other device for successful CD burning. Device 200 can be provided in a handy carrying case in a portable fashion wherein the case can be adapted to enable a user to wear the device such as on a belt or over ones shoulder. An adapter can be provided with device 200 so that the battery of the device may be charged in a mobile embodiment such as from a lighter output voltage socket of an automobile or from any wall outlet similar to charging of batteries used in camera recorders, cellular telephones and laptop computers.

The method and apparatus of the present invention should be afforded the broadest possible scope under examination. The spirit and scope of the invention is limited only by the claims that follow.

What is claimed is:

1. A portable read/write disk drive device comprising: an optical disk drive apparatus capable of reading and writing storage media from at least one of a group comprising a compact disk, CD, a digital video disk, DVD, and a video compact disk, VCD;

at least one docking bay for accepting insertable storage media;

a display;

one or more buttons, at least one of which is a multifunction input button; and a processor plus firmware enabling functions of the read/write disk drive device such that upon loading of storage media into the read/write disk drive device the processor plus firmware initiates automatically either the enabled operation when only one operation can be enabled or presents a user with options via the display and the multifunction button when more than one operation may be selected, wherein the functions of the multifunction button are determined by the instant configuration of the optical disk drive apparatus and the at least one docking bay as determined by the processor plus firmware and displayed on the display.

2. The portable read/write disk drive device of claim 1 further comprises at least one of an audio port, video display unit connection, two or more docking bays, USB port, ATA/ATAP interface, IDE Interface, second read/write disk drive, interactive display and portable power source.

* * * * *